United States Patent
Sim et al.

(10) Patent No.: US 9,279,050 B2
(45) Date of Patent: Mar. 8, 2016

(54) NON-HALOGEN FLAME RETARDANT STYRENE RESIN COMPOSITION

(71) Applicant: LG CHEM, LTD., Seoul (KR)

(72) Inventors: Jae Yong Sim, Daejeon (KR); Ki Young Nam, Daejeon (KR); Yong Yeon Hwang, Daejeon (KR); Je Sun Yoo, Daejeon (KR); Min Sul Jang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 95 days.

(21) Appl. No.: 14/156,131

(22) Filed: Jan. 15, 2014

(65) Prior Publication Data

US 2014/0243454 A1  Aug. 28, 2014

(30) Foreign Application Priority Data

Feb. 26, 2013 (KR) .................... 10-2013-0020356
Dec. 3, 2013 (KR) .................... 10-2013-0149058

(51) Int. Cl.
| | |
|---|---|
| *C08L 25/12* | (2006.01) |
| *C08L 25/04* | (2006.01) |
| *C08L 51/00* | (2006.01) |
| *C08L 55/02* | (2006.01) |
| *C08L 63/00* | (2006.01) |
| *C08L 63/10* | (2006.01) |
| *C08G 59/14* | (2006.01) |

(52) U.S. Cl.
CPC ........... *C08L 51/003* (2013.01); *C08G 59/1477* (2013.01); *C08L 25/12* (2013.01); *C08L 63/00* (2013.01)

(58) Field of Classification Search
CPC .................................................. C08G 59/1477
See application file for complete search history.

(56) References Cited

U.S. PATENT DOCUMENTS

| | | | |
|---|---|---|---|
| 2001/0003771 A1* | 6/2001 | Wang et al. | ................... 525/523 |
| 2005/0239975 A1 | 10/2005 | Gan et al. | |
| 2012/0043118 A1 | 2/2012 | Kaimori et al. | |

FOREIGN PATENT DOCUMENTS

| | | | | |
|---|---|---|---|---|
| EP | 2505607 A1 | * | 10/2012 | |
| JP | 2000143942 A | * | 5/2000 | ............. C08L 63/00 |
| JP | 2003-55434 A | | 2/2003 | |
| JP | 2009-67996 A | | 4/2009 | |
| KR | 10-1044656 B1 | | 6/2011 | |
| KR | 1020120111502 A | | 10/2012 | |
| KR | 10-2012-0135402 A | | 12/2012 | |

OTHER PUBLICATIONS

Kukdo YDPN-638 Technical Data Sheet (Dec. 2004).*
Machine translation of JP 2000-143942.*

* cited by examiner

*Primary Examiner* — Mark Kaucher
*Assistant Examiner* — Kregg Brooks
(74) *Attorney, Agent, or Firm* — Dentons US LLP

(57) ABSTRACT

Disclosed is a non-halogen flame retardant styrene resin composition which comprises (a) a styrene resin and (b) a phosphorous-modified epoxy resin and thus exhibits superior flame retardancy to external candle flame ignition.

13 Claims, No Drawings

NON-HALOGEN FLAME RETARDANT STYRENE RESIN COMPOSITION

The present invention claims the benefit of Korean Patent Application No. 10-2013-0020356, filed on Feb. 26, 2013, and Korean Patent Application No. 10-2013-0149058, filed on Dec. 3, 2013, which are hereby incorporated by reference for all purposes as if fully set forth herein.

BACKGROUND OF THE INVENTION

1. Field of the Invention

The present invention relates to a non-halogen flame retardant styrene resin composition. More particularly, the present invention relates to a non-halogen flame retardant styrene resin composition which comprises (a) a styrene resin and (b) a phosphorous-modified epoxy resin and thus exhibits superior flame retardancy to external candle flame ignition.

2. Description of the Related Art

In general, an acrylonitrile-butadiene-styrene (hereinafter, referred to as ABS) resin is widely used as an exterior material of electric/electrical products and office machines and the like due to stiffness and chemical resistance of acrylonitrile, and processability and mechanical properties of butadiene and styrene. However, the ABS resin is inherently readily combustible and thus does not almost have flame retardancy.

Due to these problems, the ABS resin used for electrical and electronic products, office machines and the like should satisfy flame-retardancy standards in order to secure safety to flame of electrical and electronic products.

Methods for imparting flame retardancy to ABS resins include polymerization of rubber-modified styrene resins through incorporation of flame-retardant monomers, mixing a flame retardant and an auxiliary flame retardant with the prepared rubber-modified styrene resin and the like. Examples of the flame retardant include halogen flame retardants and non-halogen flame retardants such as phosphorous, nitrogen and hydroxide flame retardants, and examples of the auxiliary flame retardant include antimony compounds, zinc compounds, polysiloxane compounds and the like. However, when halogen flame retardants are used, corrosive toxic gases such as HBr and HCl are generated due to high temperature and pressure entailed during processing of ABS resins, thus disadvantageously having negative effects on work environment and human. This problem is disadvantageously generated during combustion of ABS resins comprising a halogen flame retardant.

Accordingly, research to solve these problems is actively underway. Phosphorus flame retardants attract the most attention in terms of environment, efficiency and cost.

However, phosphorous flame retardants should be added in amounts higher than halogen flat retardants and generally exhibit flame retardancy by solid phase reaction. Accordingly, a char former should be also added in an excessive amount when it is difficult to generate char using a base rein. During this process, physical properties of the base resin may be greatly damaged and an approach for minimizing amounts of added phosphorous flame retardants and char former is thus required.

Meanwhile, there is a vertical combustion test method in accordance with UL94 associated with a flame retardant standard and a flame retardancy identification test method. This test method is a standard to evaluate flame resistance against internal combustion caused by short circuit or the like of a circuit substrate present in electronic products. Meanwhile, an external candle flame ignition standard (related standard: IEC TS 62441) which is standardized is a standard through which flame resistance of a final product is evaluated, when a candle as an exterior ignition source comes in contact with the electronic product due to changes in external environments.

The external candle flame ignition standard is utilized in a wider range of applications since subjects to which the standard is applied are all combustible materials and is more realistic since the standard presumes a case of flames of burning candles as fires which may often be generated in houses.

SUMMARY OF THE INVENTION

Therefore, the present invention has been made in view of the above problems, and it is one object of the present invention to provide a flame retardant styrene resin composition which satisfies IEC TS 62441, an external candle flame ignition standard, while decreasing an amount of a non-halogen flame retardant compound added to a styrene resin.

It is another object of the present invention to provide a non-halogen flame retardant styrene resin composition which is based on a non-halogen flame retardant compound and imparts sufficient flame retardancy to pass IEC TS 62441, which is a flame retardancy standard of external candle flame ignition, to a styrene resin as a base resin.

The objects can be accomplished by the present invention described below.

In accordance with an aspect of the present invention, the above and other objects can be accomplished by the provision of a non-halogen flame retardant styrene resin composition comprising (A) a styrene resin as a base resin and (B) a phosphorous-modified epoxy resin.

The (B) phosphorous-modified epoxy resin may comprise a repeat unit containing an epoxy group, a repeat unit containing phosphorous and a repeat unit containing a urethane group.

The repeat unit containing an epoxy group is not particularly limited so long as it is a common repeat unit of an epoxy resin and may be, for example, an o-cresol novolac monomer-derived repeat unit. In this case, there is an advantage in that flame retardancy efficiency is excellent.

The repeat unit containing phosphorous may be, for example, a repeat unit produced by reacting a part of the repeat unit containing an epoxy group with a phosphorous compound having a functional group.

The functional group may be, for example, a reactive group which reacts with an epoxy group to form a covalent bond.

The repeat unit containing a urethane group may be, for example, a repeat unit produced by reacting a part of the repeat unit containing an epoxy group with a reaction product of an isocyanate compound and polyol.

The isocyanate compound may be, for example, a diisocyanate compound. In this case, there is an advantage in that flame retardancy efficiency is excellent.

The (B) phosphorous-modified epoxy resin may be, for example, a urethane-modified epoxy resin modified with a phosphorous compound.

The (B) phosphorous-modified epoxy resin may have a phosphorous content of 0.5 to 6% by weight.

The (B) phosphorous-modified epoxy resin may have an epoxy equivalent weight of 400 to 2,000 g/eq.

The (B) phosphorous-modified epoxy resin may have a softening point of 60 to 120° C.

The non-halogen flame retardant styrene resin composition may, for example, comprise (A) 100 parts by weight of a styrene resin and (B) 1 to 30 parts by weight of a phosphorous-modified epoxy resin.

The (A) styrene resin may, for example, comprise at least one selected from the group consisting of acrylonitrile-butadiene-styrene (ABS) copolymers, styrene-acrylonitrile (SAN) copolymers, polystyrene (PS) copolymers, high-impact polystyrene (HIPS) copolymers and mixtures thereof.

The (A) styrene resin may, for example, comprise 10 to 90% by weight of an acrylonitrile-butadiene-styrene (ABS) copolymer and 10 to 90% by weight of a styrene-acrylonitrile (SAN) copolymer.

For example, the acrylonitrile-butadiene-styrene (ABS) copolymer may be prepared by emulsion graft polymerization and has a butadiene rubber content of 30 to 70% by weight.

The styrene-acrylonitrile (SAN) copolymer may, for example, have a weight average molecular weight of 50,000 to 150,000 g/mol and an acrylonitrile monomer content of 20 to 40% by weight.

The (B) phosphorous-modified epoxy resin may, for example, have repeat units represented by the following Formulae 3C, 3D and 3E.

[Formula 3C]

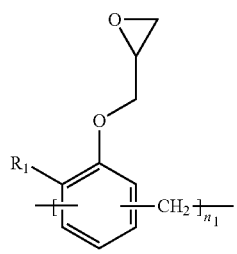

[Formula 3D]

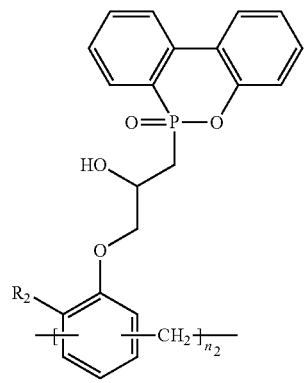

[Formula 3E]

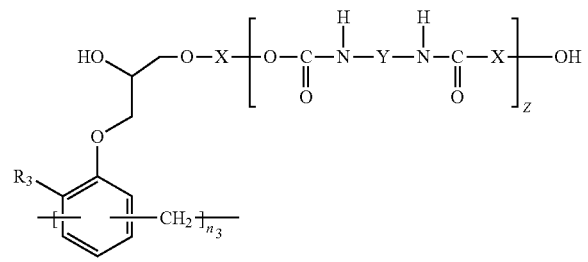

wherein $R_1$, $R_2$ and $R_3$ each independently represent a hydrogen atom, C1-C20 alkyl, C6-C24 aryl or C7-C30 alkylaryl, X and Y each independently represent C1-C20 unsubstituted, or oxygen or nitrogen-substituted alkylene, C6-C24 unsubstituted, or oxygen or nitrogen-substituted arylene, or C7-C30 unsubstituted, or oxygen or nitrogen-substituted divalent alkylaryl, $n_1$, $n_2$ and $n_3$ each independently represent an integer of 0 to 100, with a proviso that all of $n_1$, $n_2$ and $n_3$ are not zero, and Z is an integer of 1 to 3.

For example, the compound of Formula 3D may be a reaction product of the compound represented by Formula 3C above and

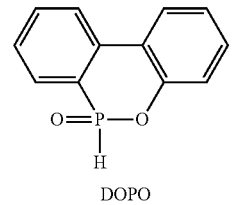

DOPO

For example, the compound of Formula 3E may be a reaction product of the compound represented by Formula 3C and

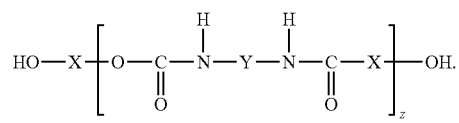

The non-halogen flame retardant styrene resin composition may further comprise at least one additive selected from the group consisting of char formers, non-halogen flame retardant compounds, impact reinforcing agents, lubricants, heat stabilizers, antidropping agents, antioxidants, photostabilizers, UV blockers, pigments and inorganic fillers.

The additive may be present in an amount of 0.1 to 60 parts by weight with respect to 100 parts by weight of the base resin comprising the styrene resin.

DETAILED DESCRIPTION OF THE INVENTION

Hereinafter, the present invention will be described in detail.

During continuous research associated with flame retardants satisfying IEC TS 62441 which is a flame retardancy standard of external candle flame ignition while reducing addition of a non-halogen flame retardant compound to a variety of styrene resins such as acrylonitrile-butadiene-styrene (ABS) copolymers, styrene-acrylonitrile (SAN) copolymers, polystyrene (PS) copolymers, high-impact polystyrene (HIPS) copolymers and mixtures thereof, in an attempt to solve the problems of the prior art, the inventors discovered that flame retardancy is improved when a phosphorous-modified epoxy resin is added to a base resin comprising a styrene resin, as compared to when a phosphorous flame retardant and an epoxy resin are separately added, and completed the present invention, based on the discovery.

Hereinafter, the present invention will be described in detail.

The non-halogen flame retardant styrene resin composition with superior flame retardancy according to the present invention comprises (A) a styrene resin as a base resin and (B) a phosphorous-modified epoxy resin.

The non-halogen flame retardant styrene resin composition with superior flame retardancy comprises (A) 100 parts by weight of a styrene resin and (B) 1 to 30 parts by weight of a phosphorous-modified epoxy resin.

Respective components constituting the non-halogen flame retardant styrene resin composition with superior flame retardancy will be described in detail below.

(A) Base Resin

The (A) base resin according to the present invention comprises a styrene resin and the styrene resin may be an acrylonitrile-butadiene-styrene (ABS) copolymer, a styrene-acrylonitrile (SAN) copolymer, a polystyrene (PS) copolymer, a high-impact polystyrene (HIPS) copolymer or a mixture thereof and for example preferably comprises 10 to 90% by weight of an acrylonitrile-butadiene-styrene (ABS) copolymer and 10 to 90% by weight of a styrene-acrylonitrile (SAN) copolymer in view of mechanical properties of resins.

In another example, the styrene resin comprises 20 to 50% by weight of an ABS copolymer and 50 to 80% by weight of a SAN copolymer, or 20 to 40% by weight of an ABS copolymer and 60 to 80% by weight of a SAN copolymer. Within this range, mechanical properties are advantageously excellent.

The acrylonitrile-butadiene-styrene (ABS) copolymer is not particularly limited, but is preferably prepared by emulsion graft polymerization and has a butadiene rubber content of 30 to 70% by weight. For example, the butadiene rubber content may be 40 to 60% by weight or 50 to 60% by weight.

In addition, a butadiene rubber, an acrylonitrile monomer and a styrene monomer are polymerized by emulsion graft polymerization and are aggregated, dehydrated and dried to prepare an ABS copolymer as a powder. The butadiene rubber has a number average particle diameter of 0.1 to 0.5 μm and is generally added in a relatively high amount of % by weight.

The emulsion graft polymerization is preferably carried out by continuously or batchwise adding a monomer mixture comprising 5 to 40 parts by weight of acrylonitrile and 20 to 65 parts by weight of styrene to a mixture solution comprising 30 to 70 parts by weight of a butadiene rubber, 0.1 to 5 parts by weight of an emulsifier, 0.1 to 3 parts by weight of a molecular modifier and 0.05 to 1 parts by weight of a polymerization initiator, based on 100 parts by weight in total of monomers present in the acrylonitrile-butadiene-styrene copolymer.

For example, the emulsion graft polymerization is preferably carried out by continuously or batchwise adding a monomer mixture comprising 5 to 30 parts by weight of acrylonitrile and 20 to 50 parts by weight of styrene to a mixture solution comprising 45 to 70 parts by weight of a butadiene rubber, 0.6 to 2 parts by weight of an emulsifier, 0.2 to 1 parts by weight of a molecular modifier and 0.05 to 0.5 parts by weight of a polymerization initiator, based on 100 parts by weight in total of monomers present in the acrylonitrile-butadiene-styrene copolymer.

The aggregation is preferably carried out using a 1 to 10% sulfuric acid or sulfate aqueous solution, for example, a 1 to 5% sulfuric acid or sulfate aqueous solution.

Preferably, the styrene-acrylonitrile (SAN) copolymer has a weight average molecular weight of 10,000 to 300,000 g/mol and an acrylonitrile monomer content of 5 to 50% by weight and may be used alone or in combination of two or more types.

For example, the styrene-acrylonitrile (SAN) copolymer has a weight average molecular weight of 30,000 to 200,000 g/mol and an acrylonitrile monomer content of 10 to 40% by weight, or has a weight average molecular weight of 50,000 to 150,000 g/mol and an acrylonitrile monomer content of 20 to 40% by weight.

(B) Phosphorous-Modified Epoxy Resin

The phosphorous-modified epoxy resin may be present in an amount of 1 to 30 parts by weight with respect to 100 parts by weight of the base resin. The thermoplastic resin composition prepared within this range has advantages of superior thermal stability and weather resistance, without greatly deteriorating mechanical strength and flowability. For example, the phosphorous-modified epoxy resin may be 5 to 30 parts by weight or 10 to 30 parts by weight. Within this range, there is an advantage in that thermal stability and weather resistance are superior and balance between physical properties is excellent.

For example, the phosphorous-modified epoxy resin is not particularly limited so long as it has compatibility with the base resin, produces a char when a processed thermoplastic resin combusts and facilitates dehydration based on phosphorous present therein.

Preferably, the phosphorous-modified epoxy resin comprises at least one selected from phosphorous-modified epoxy resins having repeat units C, D and E represented by the following Formula 3 obtained by reacting an epoxy resin having a repeat unit represented by the following Formula 1A or 1B, with a reactive phosphorous flame retardant compound, 9,10-dihydro-9-oxa-10-phosphaphenanthrene-10-oxide (DOPO) having a structure represented by the following Formula 2 in terms of improvement in flame retardancy to external candle flame ignition.

[Formula 1A]

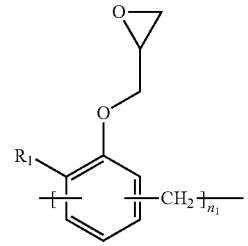

[Formula 1B]

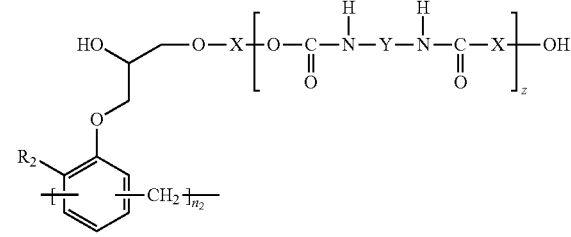

In Formula 1, $R_1$ and $R_2$ each independently represent a hydrogen atom, C1-C20 alkyl, C6-C24 aryl, or C7-C30 alkylaryl, X and Y each independently represent C1-C20 unsubstituted, or oxygen or nitrogen-substituted alkylene, C6-C24 unsubstituted, or oxygen or nitrogen-substituted arylene, or C7-C30 unsubstituted, or oxygen or nitrogen-substituted divalent alkylaryl, $n_1$ and $n_2$ each independently represent an integer of 0 to 100, with a proviso that all of $n_1$ and $n_2$ are not zero, and z is an integer of 1 to 3.

In another example, in Formula 1, $n_1$ is an integer of 1 to 100 and $n_2$ is an integer of 0 to 100 or an integer of 1 to 100.

[Formula 2]

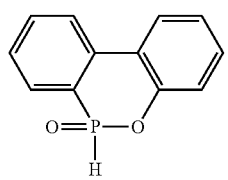

[Formula 3]

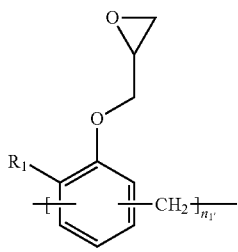

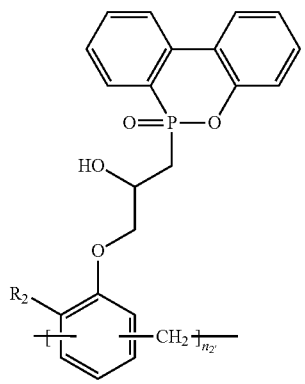

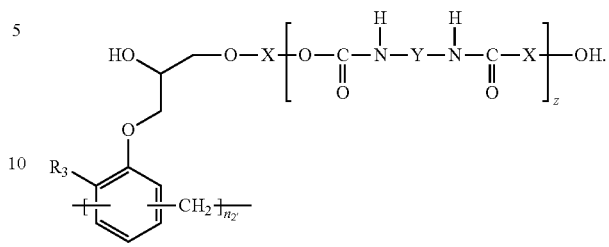

wherein $R_1$, $R_2$ and $R_3$ each independently represent a hydrogen atom, C1-C20 alkyl, C6-C24 aryl, or C7-C30 alkylaryl, X and Y each independently represent C1-C20 unsubstituted, or oxygen or nitrogen-substituted alkylene, C6-C24 unsubstituted, or oxygen or nitrogen-substituted arylene, or C7-C30 unsubstituted, or oxygen or nitrogen-substituted divalent alkylaryl, $n_1'$, $n_2'$ and $n_3'$ each independently represent an integer of 0 to 100, with a proviso that all of $n_1'$, $n_2'$ and $n_3'$ are not zero, and Z is an integer of 1 to 3.

In another example, in Formula 3, $n_2'$ represents an integer of 1 to 100, $n_1'$ and $n_3'$ each independently represent an integer of 0 to 100 or an integer of 1 to 100, and Z is an integer of 1 to 3.

The phosphorous-modified epoxy resin has, for example, a phosphorous content of 0.5 to 6% by weight, an epoxy equivalent weight of 400 to 2,000 g/eq and a softening point of 60 to 120° C. In another example, the phosphorous-modified epoxy resin has a phosphorous content of 0.5 to 5% by weight or 1 to 5% by weight, an epoxy equivalent of 400 to 1,500 g/eq or 500 to 1,200 g/eq, and a softening point of 60 to 110° C. or 70 to 110° C. Within this range, there is an advantage in that flame retardancy efficiency is excellent.

In a preferred example, the phosphorous-modified epoxy resin has a structure represented by the following Formula 4.

[Formula 4]

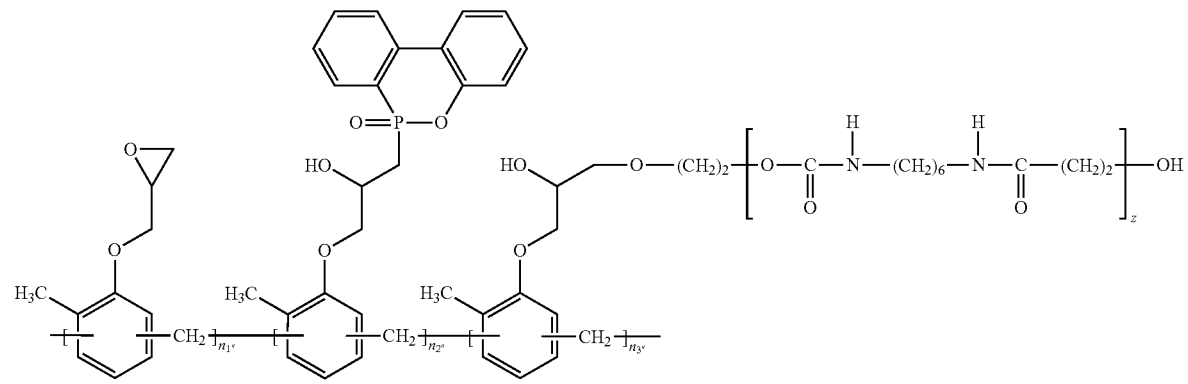

wherein $n_1''$, $n_2''$ and $n_3''$ each independently represent an integer of 0 to 100, with a proviso that all of $n_1''$, $n_2''$ and $n_3''$ are not zero.

In another example, in Formula 4, $n_2''$ represents an integer of 1 to 100, $n_1''$ and $n_3''$ each independently represent an integer of 0 to 100 or an integer of 1 to 100, and Z is an integer of 1 to 3.

The composition according to the present invention may further comprise at least one additive selected from a char former, a non-halogen flame retardant compound, an impact reinforing agent, a lubricant, a heat stabilizer, an antidropping agent, an antioxidant, a photostabilizer, a UV blocker, a pigment and an inorganic filler, with respect to 100 parts by weight of the base resin comprising a styrene resin. For example, the additive may be further added in an amount of 0.1 to 50 parts by weight or 0.5 to 40 parts by weight.

A method for preparing the flame retardant composition of the present invention may include adding all components to an extruder, and mixing, extruding and further injecting the components at a barrel temperature of 180 to 250° C. The extruder is not particularly limited and may be a twin screw extruder.

The composition satisfies IEC TS 62441 which is a flame retardancy standard of external candle flame ignition.

Hereinafter, preferred examples will be provided for better understanding of the present invention. These examples are only provided to illustrate the present invention and it will be apparent to those skilled in the art that various modifications and alternations are possible within the scope and technical range of the present invention. Such modifications and alternations fall within the scope of claims included herein.

EXAMPLE

Example 1

100 parts by weight of a base resin consisting of 30 parts by weight of an ABS copolymer (containing 55% by weight of a butadiene rubber) produced by LG Chem. Ltd. by emulsion graft polymerization using a butadiene rubber latex having a number average particle diameter of 0.3 μm and 70 parts by weight of a styrene-acrylonitrile copolymer (SAN copolymer) having an acrylonitrile content of 25% by weight and a weight average molecular weight of 120,000, 10 parts by weight of a phosphorous-modified epoxy resin A having a phosphorous content of 2.5% by weight, an epoxy equivalent weight of 410 g/eg and a softening point of 87° C., obtained by adding 500 g of a urethane-modified epoxy resin (product name: KD-1090, available from Kukdo Chemical Co., Ltd.) having an epoxy equivalent weight of 219 g/eq and a softening point of 95° C. and 96 g of DOPO to a four-neck round flask equipped with a stirrer, a heating mantle and a joint, slowly heating the resulting mixture to 160° C. and reacting the mixture for about 5 hours, 1.0 part by weight of a lubricant and 0.5 parts by weight of an antioxidant were homogeneously mixed using a Hansel mixer, and a thermoplastic resin composition was then prepared as a pellet using a twin screw extruder.

The pellet-form thermoplastic resin composition was injection-molded to produce a flame retardant sample having a width of 15 cm, a length of 15 cm and a thickness of 3 mm.

Example 2

The same process as in Example 1 was repeated except that 30 parts by weight of the ABS copolymer, 70 parts by weight of the styrene-acrylonitrile copolymer, 10 parts by weight of a phosphorous-modified epoxy resin B having a phosphorous content of 2.2% by weight, an epoxy equivalent weight of 625 g/eg and a softening point of 83° C., obtained by adding 500 g of a urethane-modified epoxy resin (product name: KD-1090, available from Kukdo Chemical Co., Ltd.) having an epoxy equivalent weight of 219 g/eq and a softening point of 95° C. and 220 g of DOPO to a four-neck round flask equipped with a stirrer, a heating mantle and a joint, slowly heating the resulting mixture to 160° C. and reacting the mixture for about 5 hours, 1.0 part by weight of the lubricant and 0.5 parts by weight of the antioxidant were used.

Example 3

The same process as in Example 1 was repeated except that 30 parts by weight of the ABS copolymer, 70 parts by weight of the styrene-acrylonitrile copolymer, 20 parts by weight of the phosphorous-modified epoxy resin A, 1.0 part by weight of the lubricant, and 0.5 parts by weight of the antioxidant were used.

Example 4

The same process as in Example 1 was repeated except that 30 parts by weight of the ABS copolymer, 70 parts by weight of the styrene-acrylonitrile copolymer, 20 parts by weight of the phosphorous-modified epoxy resin B, 1.0 part by weight of the lubricant, and 0.5 parts by weight of the antioxidant were used.

Example 5

The same process as in Example 1 was repeated except that an unmodified epoxy resin, instead of the urethane-modified epoxy resin, was reacted with DOPO to produce a phosphorous-modified epoxy resin C.

Comparative Example 1

The same process as in Example 1 was repeated except that 5 parts by weight of an epoxy resin C (product name: YDCN-500-90P, available from Kukdo Chemical Co., Ltd.) represented by the following Formula 5, and 5 parts by weight of 9,10-dihydro-9-oxa-10-phosphaphenanthrene-10-oxide (DOPO), the phosphorous flame retardant compound represented by Formula 2 above, were used, instead of the phosphorous-modified epoxy resin A.

[Formula 5]

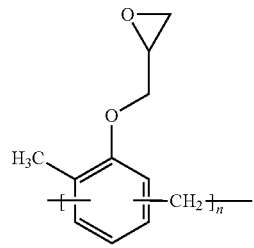

wherein n is a natural number of 1 to 100.

Comparative Example 2

The same process as in Example 1 was repeated except that 5 parts by weight of the epoxy resin C represented by Formula 5 and 5 parts by weight of resorcinol tetraphenyl-diphosphate (RDP) as a phosphorous flame retardant compound were used, instead of the phosphorous-modified epoxy resin A.

Comparative Example 3

The same process as in Example 1 was repeated except that 5 parts by weight of a urethane-modified epoxy resin D (product name: KD-1090, available from Kukdo Chemical Co., Ltd.) and 5 parts by weight of resorcinol tetraphenyl-diphosphate (RDP) as the phosphorous flame retardant compound were used, instead of the phosphorous-modified epoxy resin A.

Comparative Example 4

The same process as in Example 1 was repeated except that 10 parts by weight of the epoxy resin D and 10 parts by weight of resorcinol tetraphenyl-diphosphate (RDP) as the phosphorous flame retardant compound, were used, instead of the phosphorous-modified epoxy resin A.

Test Example

Flame retardancy of flame retardant composition samples prepared in Examples 1 to 5 and Comparative Examples 1 to 4 was measured in accordance with IEC TS 62441 and results are shown in Table 1 below.

Specifically, so as to measure flame retardancy of the external candle flame ignition, simulation testing of a candle having a diameter of 20 mm and having a length of 150 mm was performed according to the following procedure.

Sample pre-treatment (conditioning)—Candle flame testing was performed in a laboratory at 15 to 35° C. and at a relative humidity of 45 to 75% within one hour after pre-treatment in a chamber at 23±2° C. and at a relative humidity of 50±5% for at least 24 hours.

Ignition Source—Needle burner and 12 mm test flame according to IEC 60695-11-5 were used.

Flame durability testing—a tip of a burner was placed at a position of 5±0.5 mm from a candle flame accessible area (10 mm above and 150 mm below a support surface), a horizontal axis of the burner tip was maintained within ±5 degrees and a central line of the burner tip was present within the candle flame accessible area. Although the material shrank and melted, a burner flame was maintained for three minutes and then removed. At this time, PASS was defined if the flame was extinguished within three minutes and FAIL was defined, if not.

Impact strength (Notched Izod Impact Strength): measured in accordance with ASTM D-256 using ⅛" specimen.

Heat deflection temperature: measured in accordance with ASTM D-648 using ¼" specimen.

Number average particle diameter: latex was added to a submicron particle analyzer and a particle diameter was analyzed by dynamic light scattering.

Phosphorous content: measured using X-ray fluorescene analysis (XRF)

Softening point: measured in accordance with KS M 3823.

Epoxy equivalent weight: measured in accordance with ISO 3001:1999

TABLE 1

| Items | Examples | | | | | Comparative Examples | | | |
|---|---|---|---|---|---|---|---|---|---|
| | 1 | 2 | 3 | 4 | 5 | 1 | 2 | 3 | 4 |
| ABS copolymer (parts by weight) | 30 | 30 | 30 | 30 | 30 | 30 | 30 | 30 | 30 |
| SAN copolymer (parts by weight) | 70 | 70 | 70 | 70 | 70 | 70 | 70 | 70 | 70 |
| Phosphorous-modified epoxy resin A (parts by weight) | 10 | — | 20 | — | — | — | — | — | — |
| Phosphorous-modified epoxy resin B (parts by weight) | — | 10 | — | 20 | — | — | — | — | — |
| Phosphorous-modified epoxy resin C (parts by weight) | — | — | — | — | 10 | — | — | — | — |
| Epoxy resin C (parts by weight) | — | — | — | — | — | 5 | 5 | — | — |
| Epoxy resin D (parts by weight) | — | — | — | — | — | — | — | 5 | 10 |
| DOPO (parts by weight) | — | — | — | — | — | 5 | — | — | — |
| RDP (parts by weight) | — | — | — | — | — | — | 5 | 5 | 10 |
| External Candle Flame Ignition (IEC TS 62441) | PASS | PASS | PASS | PASS | PASS | FAIL | FAIL | FAIL | PASS |
| Impact strength (Kgf cm/cm) | 10 | 5 | 4 | 4 | 4 | 12 | 13 | 11 | 3 |
| Heat deflection temperature (° C.) | 79 | 77 | 74 | 73 | 78 | 74 | 76 | 76 | 66 |

As can be seen from Table 1 above, flame retardant effect was greatly improved although a small amount of the phosphorous-modified epoxy resin obtained by reacting the reactive phosphorous flame retardant compound with the epoxy resin was added.

On the other hand, when a total amount of the epoxy resin as a char former and the phosphorous flame retardant compound was equivalent to an amount of the phosphorous-modified epoxy resin satisfying flame retardant standard, the flame retardant standard could not be satisfied and, only when the total amount was increased to 20 parts by weight, flame retardant standard could be satisfied.

When an epoxy resin as a char former and a phosphorous compound were separately added, flame retardant effect was slightly limited, as compared to when a phosphorous-modified epoxy resin was added.

Accordingly, in the non-halogen flame retardant styrene resin compositions according to Examples 1 to 4 of the present invention, when a phosphorous-modified epoxy resin prepared by reacting the epoxy resin with the phosphorous compound was used, impact strength and heat deflection temperature were not deteriorated and flame retardant effect was superior, as compared to when the epoxy resin and the phosphorous compound were separately used.

In addition, a phosphorous-modified epoxy resin (Example 1) prepared by modifying an epoxy resin with urethane and reacting the modified epoxy resin with a phosphorous compound exhibited superior physical properties (such as impact strength and heat deflection temperature) as compared to a phosphorous-modified epoxy resin (Comparative Example 1) prepared by reacting an unmodified epoxy resin with a phosphorous compound.

What is claimed is:

1. A non-halogen flame retardant styrene resin composition comprising:
   (A) a styrene resin; and
   (B) a phosphorous-modified epoxy resin,
   wherein the (B) phosphorous-modified epoxy resin has repeat units represented by following Formulae 3C, 3D and 3E,

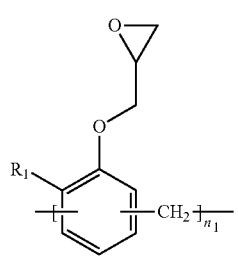

[Formula 3C]

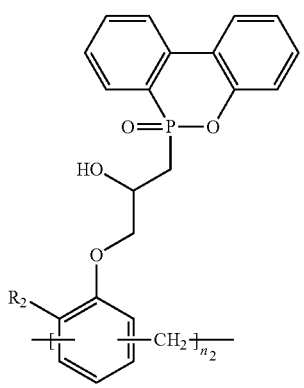

[Formula 3D]

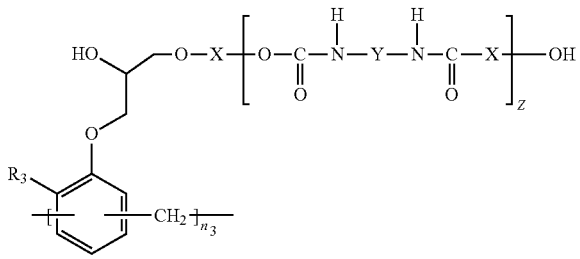

[Formula 3E]

wherein R1, R2 and R3 each independently represent a hydrogen atom, C1-C20 alkyl, C6-C24 aryl or C7-C30 alkylaryl, X and Y each independently represent C1-C20 unsubstituted, or oxygen or nitrogen-substituted alkylene, C6-C24 unsubstituted, or oxygen or nitrogen-substituted arylene, or C7-C30 unsubstituted, or oxygen or nitrogen-substituted divalent alkylaryl, $n_1$ and $n_2$ each independently represent an integer of 0 to 100, $n_3$ represents an integer of 1 to 100, and Z is an integer of 1 to 3.

2. The non-halogen flame retardant styrene resin composition according to claim 1, wherein the (B) phosphorous-modified epoxy resin comprises a repeat unit containing an epoxy group, a repeat unit containing phosphorous and a repeat unit containing a urethane group.

3. The non-halogen flame retardant styrene resin composition according to claim 1, wherein the (B) phosphorous-modified epoxy resin is a urethane-modified epoxy resin modified with a phosphorous compound.

4. The non-halogen flame retardant styrene resin composition according to claim 1, wherein the (B) phosphorous-modified epoxy resin has a phosphorous content of 0.5 to 6% by weight.

5. The non-halogen flame retardant styrene resin composition according to claim 1, wherein the (B) phosphorous-modified epoxy resin has an epoxy equivalent weight of 400 to 2,000 g/eq.

6. The non-halogen flame retardant styrene resin composition according to claim 1, wherein the (B) phosphorous-modified epoxy resin has a softening point of 60 to 120° C.

7. The non-halogen flame retardant styrene resin composition according to claim 1, wherein the non-halogen flame retardant styrene resin composition comprises:
   (A) 100 parts by weight of the styrene resin; and
   (B) 1 to 30 parts by weight of the phosphorous-modified epoxy resin.

8. The non-halogen flame retardant styrene resin composition according to claim 1, wherein the (A) styrene resin comprises at least one selected from the group consisting of acrylonitrile-butadiene-styrene (ABS) copolymers, styrene-acrylonitrile (SAN) copolymers, polystyrene (PS) copolymers, high-impact polystyrene (HIPS) copolymers and mixtures thereof.

9. The non-halogen flame retardant styrene resin composition according to claim 1, wherein the (A) styrene resin comprises 10 to 90% by weight of an acrylonitrile-butadiene-styrene (ABS) copolymer and 10 to 90% by weight of a styrene-acrylonitrile (SAN) copolymer.

10. The non-halogen flame retardant styrene resin composition according to claim 9, wherein the acrylonitrile-butadiene-styrene (ABS) copolymer is prepared by emulsion graft polymerization and has a butadiene rubber content of 30 to 70% by weight.

11. The non-halogen flame retardant styrene resin composition according to claim 9, wherein the styrene-acrylonitrile (SAN) copolymer has a weight average molecular weight of 50,000 to 150,000 g/mol and an acrylonitrile monomer content of 20 to 40% by weight.

12. The non-halogen flame retardant styrene resin composition according to claim 11, wherein the non-halogen flame retardant styrene resin composition further comprises at least one additive selected from the group consisting of char formers, non-halogen flame retardant compounds, impact reinforcing agents, lubricants, heat stabilizers, antidropping agents, antioxidants, photostabilizers, UV blockers, pigments and inorganic fillers.

13. The non-halogen flame retardant styrene resin composition according to claim 12, wherein the additive is present in an amount of 0.1 to 60 parts by weight with respect to 100 parts by weight of the styrene resin.

* * * * *